US008232946B2

(12) United States Patent
Kim et al.

(10) Patent No.: US 8,232,946 B2
(45) Date of Patent: Jul. 31, 2012

(54) LIQUID CRYSTAL DISPLAY AND DRIVING METHOD THEREOF

(75) Inventors: Hyun Jim Kim, Gyeongsangbuk-do (KR); Bu Yeol Lee, Seoul (KR); So Haeng Cho, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1072 days.

(21) Appl. No.: 11/807,306

(22) Filed: May 25, 2007

(65) Prior Publication Data

US 2008/0136764 A1 Jun. 12, 2008

(30) Foreign Application Priority Data

Dec. 7, 2006 (KR) ........................ 10-2006-0123751

(51) Int. Cl.
*G09G 3/36* (2006.01)
*G02F 1/1343* (2006.01)

(52) U.S. Cl. ......................................... 345/92; 349/139

(58) Field of Classification Search .................... 345/55, 345/84, 87, 88, 92
See application file for complete search history.

(56) References Cited

U.S. PATENT DOCUMENTS 6,064,459 A * 5/2000 Lee ............................... 349/139
2002/0154084 A1* 10/2002 Tanaka et al. ................... 345/92
2004/0135938 A1 7/2004 Choi
2005/0253829 A1 11/2005 Mamba et al.
2006/0208985 A1 9/2006 Hwang et al.

FOREIGN PATENT DOCUMENTS

| | | |
|---|---|---|
| EP | 1 300 719 A1 | 4/2003 |
| JP | 58-23092 | 2/1983 |
| JP | 05-027266 | 2/1993 |
| JP | 07-230075 | 8/1995 |
| JP | 10-149141 | 6/1998 |
| JP | 2001-282206 | 10/2001 |
| JP | 2006-235449 | 9/2006 |

OTHER PUBLICATIONS

Office Action issued in corresponding Chinese Patent Application No. 200710120695; issued Feb. 13, 2009.
Office Action issued in corresponding German Patent Application No. 10 2007 021 712.0; issued Jan. 21, 2009.
Office Action issued in corresponding Japanese Patent Application No. 2007-123863, mailed Sep. 21, 2010. 2 pages.
Office Action issued in corresponding Japanese Patent Application No. 2007-123863; issued Jun. 17, 2007.

* cited by examiner

*Primary Examiner* — Alexander S Beck
*Assistant Examiner* — Charles V Hicks
(74) *Attorney, Agent, or Firm* — Brinks Hofer Gilson & Lione

(57) ABSTRACT

A liquid crystal display and a driving method thereof having a plurality of common electrodes to which a common voltage is independently applied, and divided into more than two portions to change a potential of a common voltage into divided common electrode units, and reducing amplitude of a scanning pulse to prevent a deterioration of a display quality by a feed through voltage.

13 Claims, 14 Drawing Sheets

LIQUID CRYSTAL DISPLAY AND DRIVING METHOD THEREOF

This application claims the benefit of Korean Patent Application No. P2006-123751 filed in Korea on Dec. 7, 2006, which is hereby incorporated by reference.

TECHNICAL FIELD

The present invention relates to a liquid crystal display and a driving method thereof, and more particularly to a liquid crystal display and a driving method thereof having a plurality of common electrodes to which a common voltage is independently applied, and divided into more than two portions to change a potential of a common voltage into the divided common electrode unit, and that are adaptive for reducing amplitude of a scanning pulse to prevent a deterioration of a display quality by a feed through voltage.

BACKGROUND

Description of the Related Art

Generally, a liquid crystal display controls light transmittance of a liquid crystal using an electric field to display a picture. To this end, the liquid crystal display includes a liquid crystal display panel having liquid crystal cells arranged in a matrix type, and a driving circuit driving the liquid crystal display panel.

Referring to FIG. 1, a gate line GL and a data line DL are crossed each other at the liquid crystal display panel, and a thin film transistor (hereinafter, referred to as "TFT") driving the liquid crystal cell Clc is formed at a crossing of the gate line GL and the data line DL. The TFT supplies a data voltage Vd supplied via the data line to a pixel electrode Ep of the liquid crystal cell Clc in response to a scanning pulse supplied via the gate line GL. To this end, a gate electrode of the TFT is connected to the gate line GL, a source electrode thereof is connected to the data line DL, and a drain electrode thereof is connected to the pixel electrode of the liquid crystal cell Clc. The liquid crystal cell Clc is charged with a potential difference of the data voltage Vd supplied to the pixel electrode Ep and a common voltage Vcom supplied to a common electrode Ec. Further, an arrangement of liquid crystal molecules is changed by an electric field formed by the potential difference to adjust an amount of the transmitted light or cut off a light. The common electrode Ec is formed at an upper substrate or a lower substrate of the liquid crystal display panel depending upon a method which applies an electric field to the liquid crystal cell Clc. A storage capacitor (hereinafter, referred to as "Cst") is formed between a storage line supplied with the common voltage Vcom and the pixel electrode Ep of the liquid crystal cell Clc. In this case, the storage capacitor Cst maintains a charging voltage of the liquid crystal cell Clc.

The liquid crystal display panel is driven so as to prevent degradation of the liquid crystal cell Clc and improve a display quality by an inversion method. Herein, the inversion method inverses a polarity of the liquid crystal cell Clc in a constant unit. The inversion method is largely classified into a frame inversion, a line inversion, a column inversion, and a dot inversion. Herein, the frame inversion inverses the polarity of the liquid crystal cell in a frame unit. The line inversion inverses the polarity of the liquid crystal cell in a horizontal line unit. The column inversion inverses the polarity of the liquid crystal cell in a vertical line unit. The dot inversion inverses the polarity of the liquid crystal cell in a liquid crystal cell unit. The line inversion has an advantage of a low power consumption compared to the column inversion and the dot inversion. The column inversion and the dot inversion inverse the polarity using only data signal, so that a driving voltage scope of the data signal is relatively wide. However, the line inversion drives a data signal and a common voltage Vcom to have an inverse polarity each other to narrow a driving voltage scope of the data signal. Herein, the common voltage Vcom is supplied to the liquid crystal cell Clc as a reference voltage FIG. 2 is a diagram showing a portion of a liquid crystal display panel driven by a related art line inversion, and FIG. 3 is a diagram showing driving voltages supplied to the liquid crystal display panel in FIG. 2. In FIG. 2, 'Vcom2' represents a common voltage with which a first and second common electrodes Ec1 and Ec2 are commonly supplied. Further, in FIG. 3, 'SP1 and SP2' represent scanning pulses with which a first and second gate lines GL1 and GL2 are supplied, respectively, 'Vcom1' represents a common voltage with which a storage line SL is supplied, 'Vd' represents a data voltage with which the data line DL is supplied, 'VEp1' represents a potential of a first pixel electrode Ep1, and 'VEp2' represents a potential of a second pixel electrode Ep2.

Referring to FIG. 2 and FIG. 3, a scanning pulse SP is swung between a gate high voltage VGH turning-on the TFT and a gate low voltage VGL turning-off the TFT. In the common voltage vcom1 with which the storage line SL is supplied, potentials −Vcom and +Vcom thereof are inversed in an interval of one horizontal period 1H. In the data voltage Vd with which the data line DL is supplied, potentials +Vd and −Vd thereof are inversed in the interval of one horizontal period 1H on the basis of the common voltage Vcom1. Herein, '+Vd' represents a positive polarity data voltage having a potential higher than the common voltage Vcom1, and '−Vd' represents a negative polarity data voltage having a potential lower than the common voltage Vcom1. The data voltage Vd is supplied, via the data line DL, to the pixel electrode Ep of the liquid crystal cell Clc for a scanning period that the scanning pulse SP is maintained as the gate high voltage VGH. The common voltage Vcom2 is supplied to the common electrode Ec opposed to the pixel electrode Ep. A value of the common voltage Vcom2 with which the common electrode Ec is supplied and a value of the common voltage Vcom1 with which the storage line SL is supplied are substantially the same each other. Since the storage lines SL of the liquid crystal display panel are electrically connected to each other, a potential VEp of the pixel electrode Ep is changed by a swing of the common voltage Vcom1 for a non-scanning interval that the scanning pulse SP is maintained as the gate low voltage VGL. For example, in FIG. 3, the common voltages Vcom1 of 0V and 5V are alternatively applied and the data voltages Vd of 3V and 2V are alternatively applied so as to charge the liquid crystal cells Clc1 and Clc2 into 3V in the interval of one horizontal period 1H. In this case, the potentials VEp1 and VEp2 of the first and second pixel electrodes are continuously changed for a non-scanning interval of the scanning pulse. In other words, the potential VEp1 of the first pixel electrode is maintained as 3V by the data voltage +Vd supplied for the scanning period 1H, and then is affected by a swing of the common voltage Vcom1 for non-scanning intervals (2H and 3H, etc) to change into 8V and 3V in the interval of one horizontal period 1H. The potential VEp2 of the second pixel electrode is maintained as 2V by the data voltage −Vd supplied for the scanning period 2H, and then is affected by a swing of the common voltage Vcom1 for non-scanning intervals (3H and 4H, etc) to change into −3V and 2V in the interval of one horizontal period 1H.

Such a potential VEp change of the pixel electrode Ep for the non-scanning intervals necessarily increases amplitude of the scanning pulse.

FIG. 4 is a diagram explaining a fact that amplitude of the scanning pulse is increased by the potential Vep change of the pixel electrode Ep for a related art non-scanning interval.

Referring to FIG. 4, in a line inversion drive using a swing of the common voltage Vcom, the potentials VEp1 and VEp2 of each pixel electrode are changed in an upper direction and a lower direction. Specifically, the potential VEp2 of the pixel electrode charged for a scanning period that a high potential common voltage Vcom-High is supplied is further decreased as much as |Vcom-High−VEp2| from a low potential Vcom-Low of the common voltage for a non-scanning interval that a low potential common voltage Vcom-Low is supplied. In order to maintain the decreased potential VEp2 of the pixel electrode, a gate-off voltage requires a voltage lower than the decreased potential VEp2 of the pixel electrode. Accordingly, amplitude of the scanning pulse is |(Vd-High+Gate-On)-(Vd-Low−Gate-Off−Vcom amplitude)|. In the line inversion drive using a swing of the common voltage Vcom, the result means that amplitude of the scanning pulse is further increased as much as amplitude of the common voltage Vcom. An amplitude increase of the scanning pulse increases the feed through voltage. In the charging voltage, a voltage shift as much as ΔVp is generated by a parasitic capacitor Cgd between the gate electrode and the drain electrode of the TFT. Such ΔVp refers to as a feed through voltage. A magnitude of the feed through voltage ΔVp is in proportion to amplitude VGH-VGL of the scanning pulse. The liquid crystal cell Clc is charged with a voltage lower as much as ΔVp than the data voltage Vd corresponding to a video data by the feed through voltage ΔVp. In other words, the liquid crystal cell Clc is charged with a voltage having a potential difference lower as much as ΔVp than the data voltage Vd regarding the common voltage Vcom upon driving of the positive polarity (+). The liquid crystal cell Clc is charged with a voltage having a potential difference higher as much as ΔVp than the data voltage Vd regarding the common voltage Vcom upon driving of the negative polarity (−).

The liquid crystal display driven by the line inversion method using a swing of the related art common voltage Vcom has the following problems.

In the related art, first, an additional storage line is required at the lower substrate provided with the TFT so as to apply a common voltage swung between the high-level potential and the low-level potential, so that an aperture ratio is reduced by the storage line.

Second, a common voltage swung via the storage lines is applied, so that a potential of the pixel electrode is changed by the swung common voltage for the non-scanning interval. In this case, the storage lines are electrically connected to each other. Thus, amplitude of the scanning pulse is increased. Accordingly, in the related art liquid crystal display, the feed through voltage ΔVp is increased by an increase of scanning pulse amplitude to generate a flicker or a residual image at a screen of the liquid crystal display panel. As a result, the display quality is deteriorated.

SUMMARY

In one embodiment, a liquid crystal display includes a plurality of common electrodes to which a common voltage is separately applied. Liquid crystal cells are arranged in (m×n) matrices, where m and n are positive integers equal to or greater than two, and configured to display an image using liquid crystal molecules driven by a potential difference between pixel electrodes and the common electrodes, and including m data lines to which a data voltage is supplied and n gate lines to which a scanning pulse is supplied. A number (m×n) of storage capacitors reside between a pixel electrode of the liquid crystal cells and the gate lines and are configured to maintain voltages of the liquid crystal cells. A data driver is configured to inverse a polarity of the data voltage in units of n/k lines and to supply the data voltage to the data lines, where k a divisor of the common electrode, such that 2≦k≦n. A common voltage controller is configured to change a potential of the common voltage into units of n/k common electrodes.

In another embodiment, a method of driving a liquid crystal display described above includes, inversing a polarity of the data voltage in units of n/k lines and supplying the data voltage to the data lines, wherein k a divisor of the common electrode, such that 2≦k≦n. A potential of the common voltage is changed into units of n/k common electrode units and a voltage of the liquid crystal cells is maintained using (m×n) storage capacitors formed between a pixel electrode of the liquid crystal cell and the gate line.

In yet another embodiment, a liquid crystal display includes liquid crystal cells in pixel areas defined by crossing points of a plurality of gate lines GL1 to GLn, where n is a positive integer, and a plurality of data lines DL1 to DLm, where m is a positive integer. A data driving circuit is configured to supply a video signal to the data lines DL1 to DLm and to inverse a polarity of the data voltage in units of n/k lines, where k a divisor of the common electrode, such that 2≦k≦n. A gate driving circuit is configured to supply a scanning pulse to the gate lines GL1 to GLn. A common voltage controller is configured to allow a high-level potential and low-level potential common voltages +Vcom and −Vcom to be alternatively supplied to common electrode lines.

BRIEF DESCRIPTION OF THE DRAWINGS

These and other objects of the invention will be apparent from the following detailed description of the embodiments of the present invention with reference to the accompanying drawings, in which.

DETAILED DESCRIPTION

Hereinafter, the preferred embodiments of the present invention will be described in detail with reference to FIG. 5 to FIG. 10C.

Figure 1:
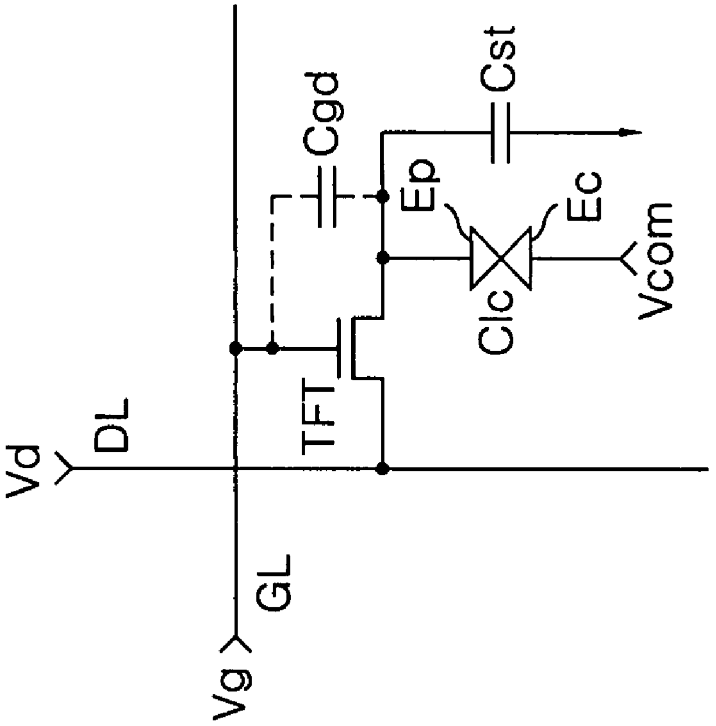
FIG. 1 RELATED ART
FIG. 1 is a diagram schematically showing a pixel cell included in a related art liquid crystal display panel.
Figure 2:
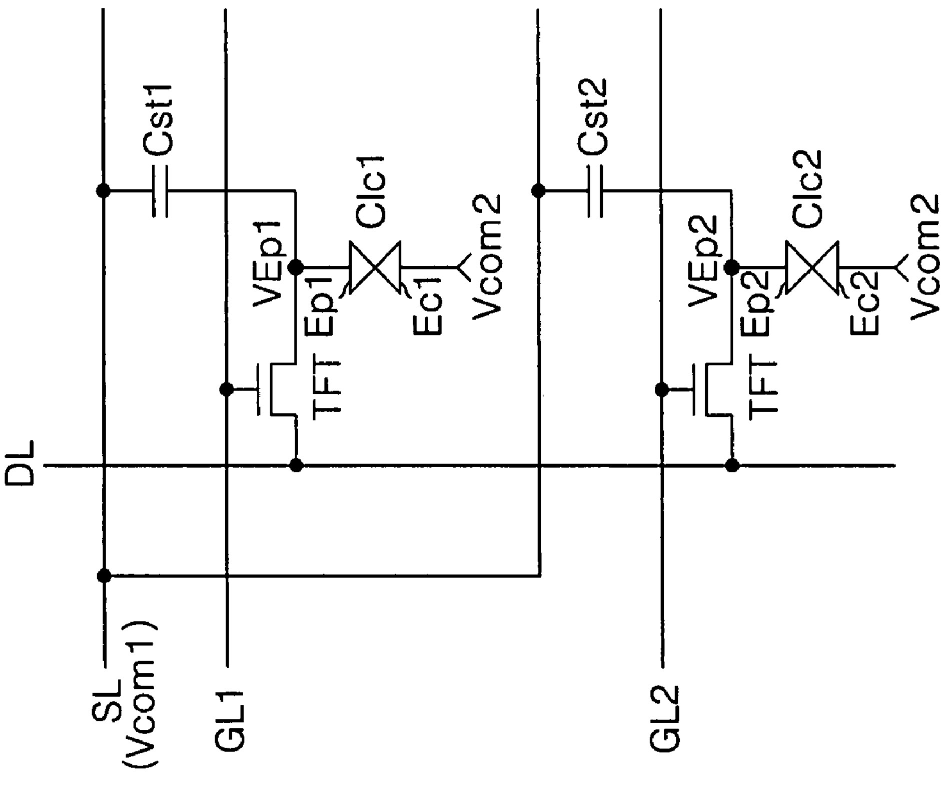
FIG. 2 RELATED ART
FIG. 2 is a diagram showing a portion of a liquid crystal display panel driven by a related art line inversion method.
Figure 3:
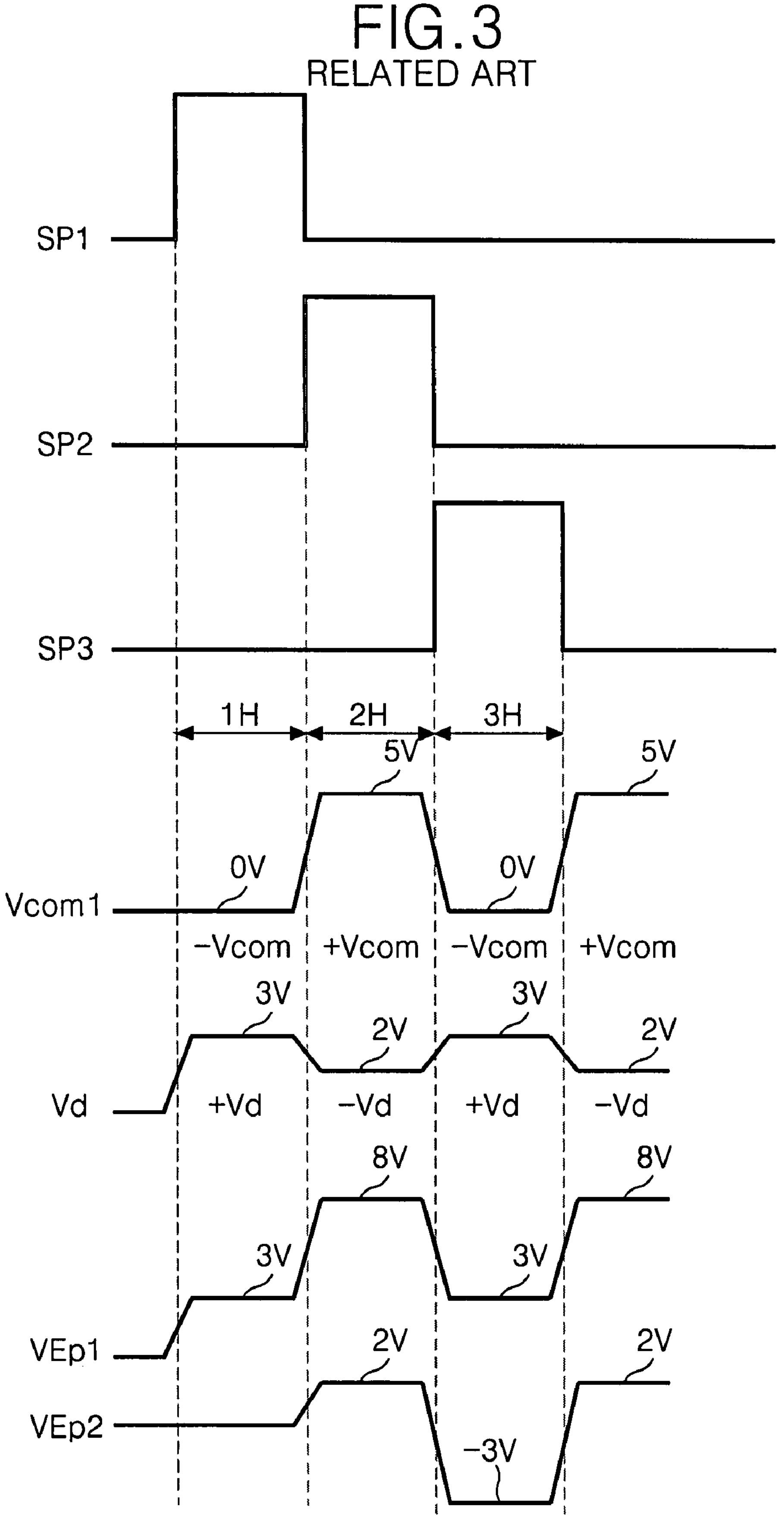
FIG. 3 RELATED ART
FIG. 3 is a diagram showing driving voltages supplied to the liquid crystal display panel in FIG. 2.
Figure 4:
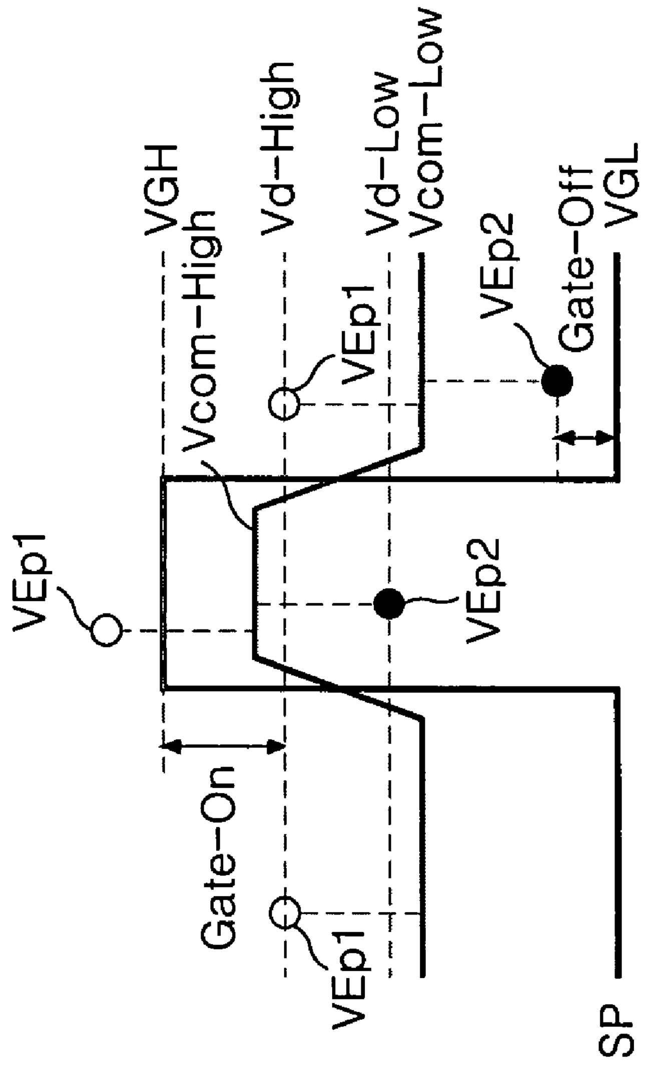
FIG. 4 RELATED ART
FIG. 4 is a diagram showing that the amplitude of a scanning pulse is increased by a potential change of a pixel electrode for a related art non-scanning interval.
Figure 5:
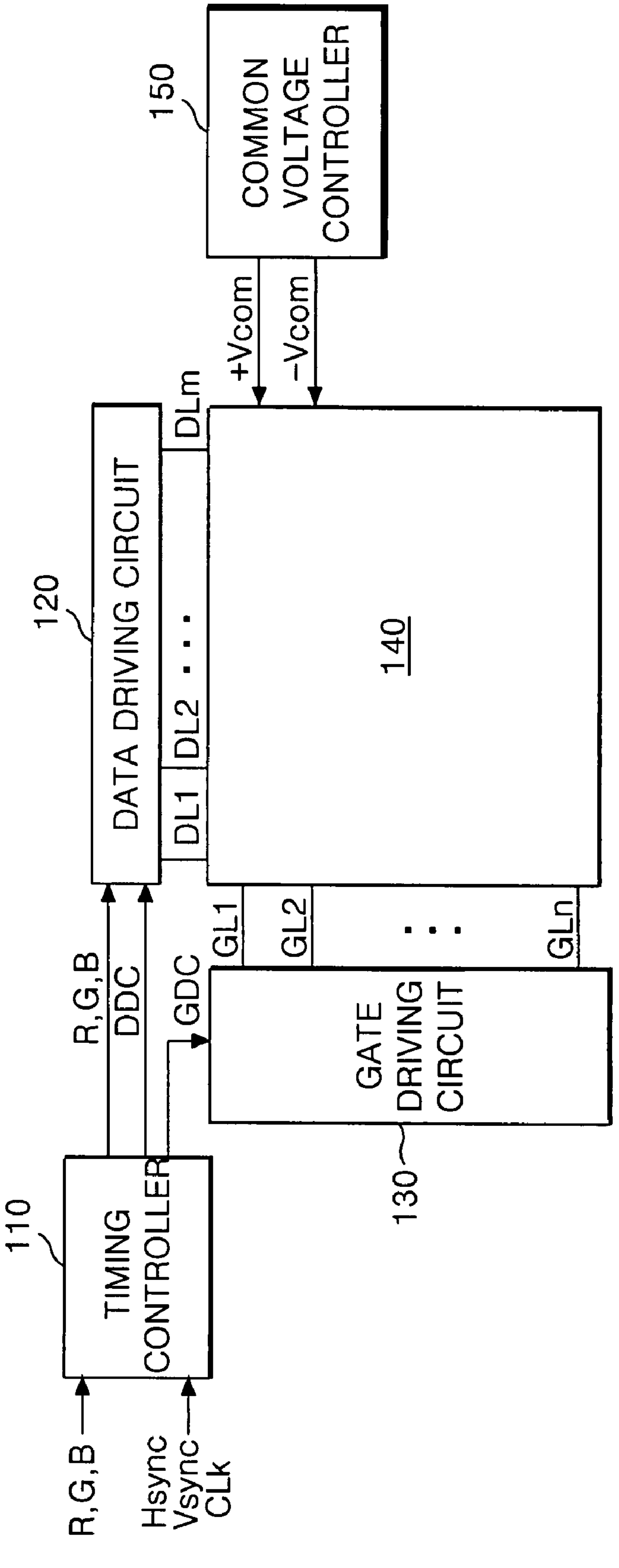
FIG. 5 is a block diagram illustrating a liquid crystal display according to an embodiment of the present invention.

FIG. 5 is a block diagram showing a liquid crystal display according to an embodiment of the present invention.

Referring to FIG. 5, a liquid crystal display according to the embodiment of the present invention includes a liquid crystal display panel 140 having liquid crystal cells formed at pixel areas defined by a crossing of a plurality of gate lines GL1 to GLn (herein, n is a positive integer) and a plurality of data lines DL1 to DLm (herein, m is a positive integer), and thin film transistors provided at each intersection of the gate lines GL1 to GLn and the data lines DL1 to DLm to drive each liquid crystal cells; a data driving circuit 120 supplying a video signal to the data lines DL1 to DLm; a gate driving circuit 130 supplying a scanning pulse to the gate lines GL1 to GLn; a timing controller 110 controlling the data driving circuit 120 and the gate driving circuit 130; and a common voltage controller 150 allowing a high-level potential/low-level potential common voltages +Vcom and −Vcom to be alternatively supplied to common electrode lines which are divided into more than two portions of the liquid crystal display panel 140.

The liquid crystal display panel 140 is formed in a structure that an upper substrate and a lower substrate are joined. The gate lines GL1 to GLn and the data lines DL1 to DLm cross each other at the lower substrate of the liquid crystal display panel 140. The thin film transistors provided at each intersection of the gate lines GL1 to GLn and the data lines DL1 to DLm supply a data voltage from the data lines DL1 to DLm to a pixel electrode of the liquid crystal cell in response to a scanning pulse from the gate lines GL1 to GLn, respectively. The liquid crystal cell is charged with a potential difference of a data voltage and a common voltage. In this case, the data voltage is supplied to the pixel electrode, and the common voltage is supplied to the common electrode. An arrangement of the liquid crystal molecules is changed by an electric field provided by the potential difference to adjust an amount of the transmitted light. The common electrode is divided into more than two portions to allow the common voltage to be independently applied, and formed at the upper substrate or the lower substrate in accordance with a method that an electric field is applied to the liquid crystal cell. A storage capacitor is formed between the pixel electrode of the liquid crystal cell and the pre-stage gate line. In this case, the storage capacitor maintains a charging voltage of the liquid crystal cell. The common electrode and the storage capacitor will be described in detail with reference to FIG. 6A to FIG. 7B. A color filter and a black matrix are formed at the upper substrate of the liquid crystal display panel 140. Herein, the color filter realizes a color, and the black matrix reduces a light interference between the adjacent pixels. Furthermore, a polarizing plate having optic axis perpendicular to each other is attached to the upper substrate and the lower substrate. An alignment film is formed at the inside of the substrates. In this case the alignment film sets a pre-tilt angle of the liquid crystal.

The timing controller 110 is supplied with digital video data RGB, vertical/horizontal synchronizing signals Hsync and Vsync, and a clock signal CLK, etc from a system interface circuit (not shown) to generate a data control signal DDC and a gate control signal GDC. In this case, the data control signal DDC controls the data driving circuit 120, and the gate control signal GDC controls the gate driving circuit 130. The timing controller 110 re-aligns the digital video data RGB in accordance with the clock signal CLK to supply them to the data driving circuit 120. Herein, the data control signal DDC includes a source shift clock SSC, a source start pulse SSP, a polarity control signal POL, etc., and the gate control signal GDC includes a gate start pulse GSP, a gate shift clock GSC, and a gate output enable signal GOE, etc.

The data driving circuit 120 converts the digital video data RGB into an analog gamma compensation voltage, that is, a data voltage to inverse a polarity of the data voltage in a (n/k) horizontal line unit (herein, k is the number of dividing the common electrode, $2 \leqq k \leqq n$), thereby supplying it to the data lines DL1 to DLm. In this case, the digital video data RGB are supplied from the timing controller 110. The data driving circuit 120 includes a shift register sampling the clock signal CLK, a register temporarily storing the digital video data RGB, a latch storing the data RGB by one line and, at the same time outputting the stored data of one line, in response to a clock signal from the shift register, a digital/analog converter selecting a positive/negative polarity gamma voltage corresponding to a digital data value from the latch, a multiplexer selecting a data line supplied with an analog data converted by the positive/negative polarity gamma voltage, and an output buffer connected between the multiplexer and the data line.

The gate driving circuit 130 sequentially supplies a scanning pulse to the gate lines GL1 to GLn. In this case, the scanning pulse selects a horizontal line of the liquid crystal display panel 140 to be supplied with the data voltage. The gate driving circuit 130 includes a shift register sequentially shifting a gate start pulse GSP from the timing controller 110 to generate a shift output signal, level shifters converting a shift output signal from the shift register into a scanning pulse having a voltage level that is adaptive for driving a thin film transistor to supply it to the gate lines GL1 to GLn, and an output buffer arranged between the level shifters and the gate lines GL1 to GLn to stabilize the scanning pulse.

The common voltage controller 150 allows a high-level potential/low-level potential common voltages +Vcom and −Vcom to be alternatively supplied to common electrode lines which are divided into more than two portions of the liquid crystal display panel 140. In other words, the common voltage controller 150 allows the low-level potential common voltage −Vcom to be supplied to a common electrode. Herein, the common electrode is opposed to pixel electrodes of a horizontal line to which the positive polarity data voltage is supplied. The common voltage controller 150 allows the high-level potential common voltage +Vcom to be supplied to a common electrode. Herein, the common electrode is opposed to the pixel electrodes of a horizontal line to which the negative polarity data voltage is supplied.

Figure 6A:
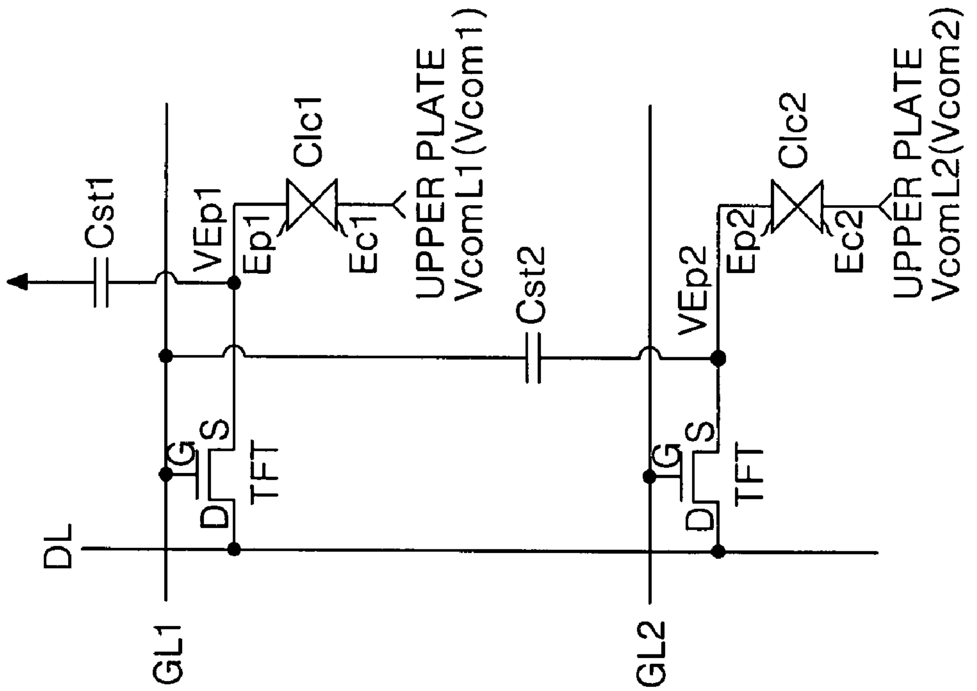
FIG. 6A is an equivalent circuit diagram illustrating a portion of a lower substrate in a liquid crystal display according to the embodiment of the present invention.
Figure 6B:
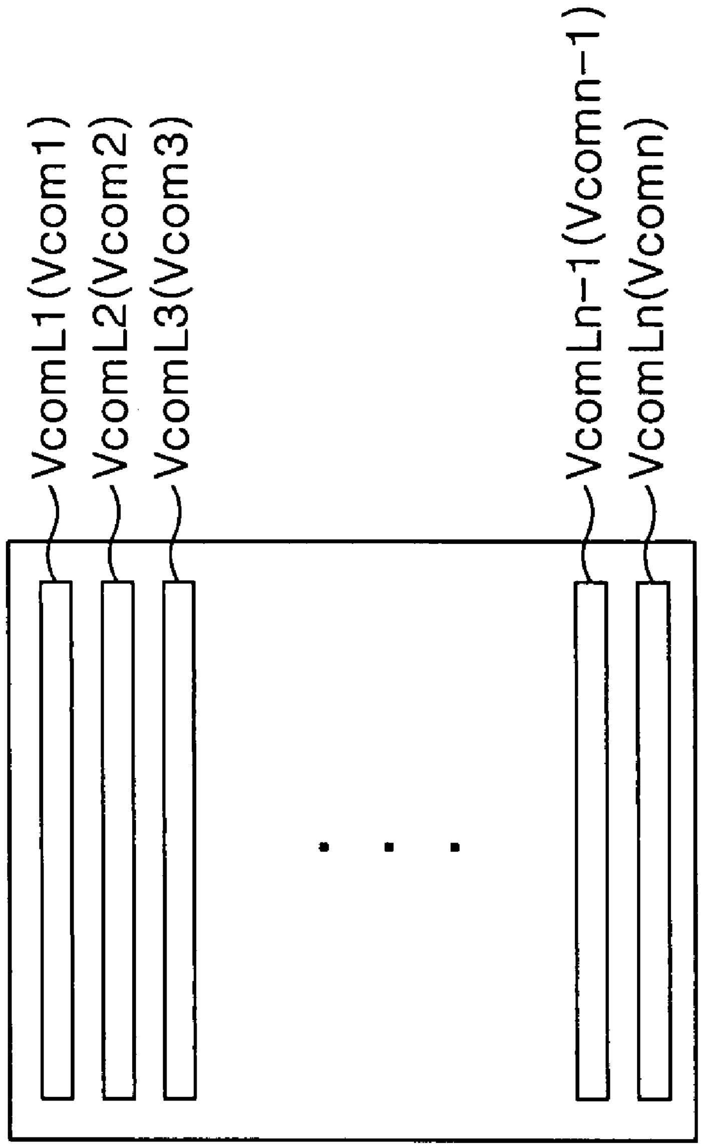
FIG. 6B is a diagram illustrating a plurality of common electrode lines divided at an upper substrate of the liquid crystal display according to the embodiment of the present invention.

FIG. 6A is a equivalent circuit diagram showing a portion of a lower substrate in a liquid crystal display of vertical electric field applying type according to the embodiment of the present invention, and FIG. 6B is a diagram showing a plurality of common electrode lines divided at an upper substrate of the liquid crystal display of vertical electric field applying type according to the embodiment of the present invention. In the liquid crystal display of vertical electric field applying type, the common electrode formed on the upper substrate and the pixel electrode formed on the lower substrate are opposed to each other. Thus the liquid crystal display of vertical electric field applying type drives a liquid crystal of a TN (Twisted Nematic) mode by a vertical electric field provided between the common electrode and the pixel electrode.

Referring to FIG. 6A, in the lower substrate of the liquid crystal display of vertical electric field applying type according to the embodiment of the present invention, the TFT is formed at an intersection of the gate lines GL1 and GL2 and the data line DL. In this case the TFT drives the liquid crystal cells Clc1 and Clc2. The TFT supplies the data voltage supplied via the data line DL to the pixel electrodes Ep1 and Ep2 of the liquid crystal cells Clc1 and Clc2 in response to the scanning pulse supplied via the gate lines GL1 and GL2. To this end, the gate electrode G of the TFT is connected to the gate lines GL1 and GL2, the source electrode S thereof is connected to the data line DL, and the drain electrode D thereof is connected to the pixel electrodes Ep1 and Ep2 of the liquid crystal cells Clc1 and Clc2. The first liquid crystal cell Clc1 is charged with a potential difference between a data voltage and a first common voltage Vcom1. Herein, the data voltage is supplied to the first pixel electrode Ep1, and the first common voltage Vcom1 is supplied to the first common electrode Ec1. Referring to FIG. 6B, the first common electrode Ec1 is connected to a first common electrode line VcomL1 of a plurality of common electrode lines VcomL1 to VcomLn which are divided at the upper substrate. The first common electrode Ec1 is independently supplied with the first common voltage Vcom1 via the first common electrode line VcomL1. Furthermore, the second liquid crystal cell Clc2 is charged with a potential difference between a data voltage and a second common voltage Vcom2. Herein, the data voltage is supplied to the second pixel electrode Ep2, and the second common voltage Vcom2 is supplied to the second common electrode Ec2. Referring to FIG. 6B, the second common electrode Ec2 is connected to a second common electrode line VcomL2 of a plurality of common electrode lines VcomL1 to VcomLn which are divided at the upper substrate. The second common electrode Ec2 is independently supplied with the second common voltage Vcom2 via the second common electrode line VcomL2. Herein, a polarity of the data voltage with which the first pixel electrode Ep1 is supplied and a polarity of the data voltage with which the second pixel electrode Ep2 is supplied are inversed each other on the basis of the common voltage. A potential of a common voltage is inversed in the divided common electrode line unit. In this case, the common voltage is supplied in accordance with a polarity inversion of the data voltage. For example, if a data voltage with which the first pixel electrode Ep1 is supplied is a positive polarity and a data voltage with which the second pixel electrode Ep2 is supplied is a negative polarity, the first common voltage Vcom1 of high-level potential is supplied and the second common voltage Vcom2 of low-level potential is supplied. As a result, the line inversion is realized.

On the other hand, the common electrode lines of the upper substrate may be divided into k instead of n (herein, $2 \leqq k \leqq n$). In this case, a polarity of the data voltage is inversed in n/k horizontal line units. Furthermore, a potential of the common voltage is inversed in the divided common electrode line unit. As a result, an n/k line inversion is realized. Hereinafter, a case that the common electrode lines of the upper substrate are divided into n will be described.

Referring to FIG. 6A, a first storage capacitor Cst1 is formed between the pixel electrode Ep1 of the first liquid crystal cell Clc1 and a dummy gate line (not shown). A second storage capacitor Cst2 is formed between the pixel electrode Ep2 of the second liquid crystal cell Clc2 and the first gate line GL1. The first and second storage capacitors Cst1 and Cst2 play a role to maintain charging voltages of the first and second liquid crystal cells Clc1 and Clc2 for one frame, respectively. Accordingly, the present invention uses the pre-stage gate line, so that an aperture ratio can be highly improved compared to the related art. Herein, the related art includes an additional storage line so as to form the storage capacitor.

Figure 7A:
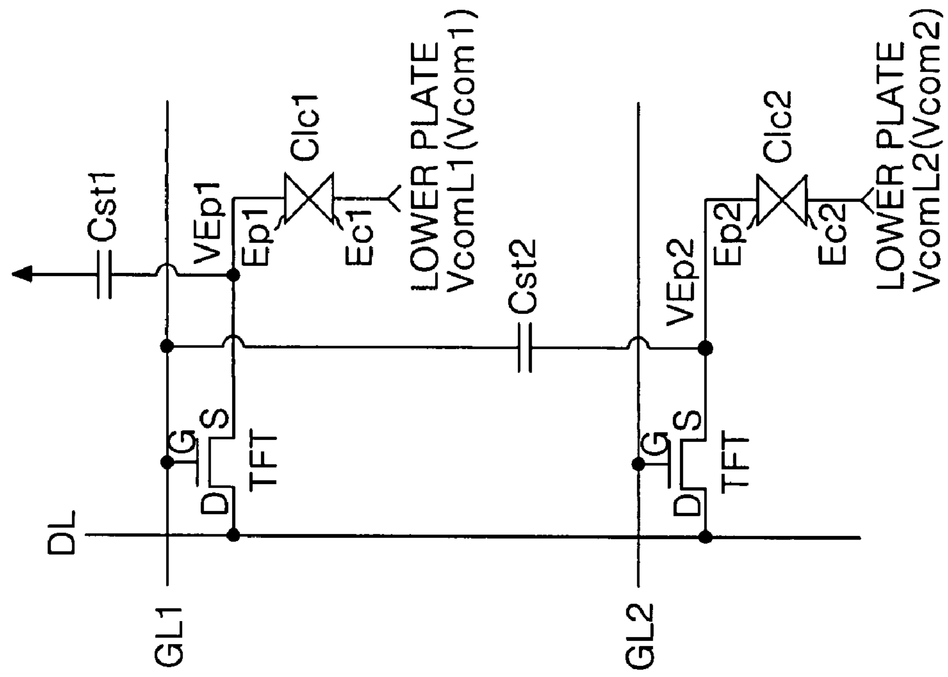
FIG. 7A is an equivalent circuit diagram illustrating a portion of a lower substrate in a liquid crystal display according to the embodiment of the present invention.
Figure 7B:
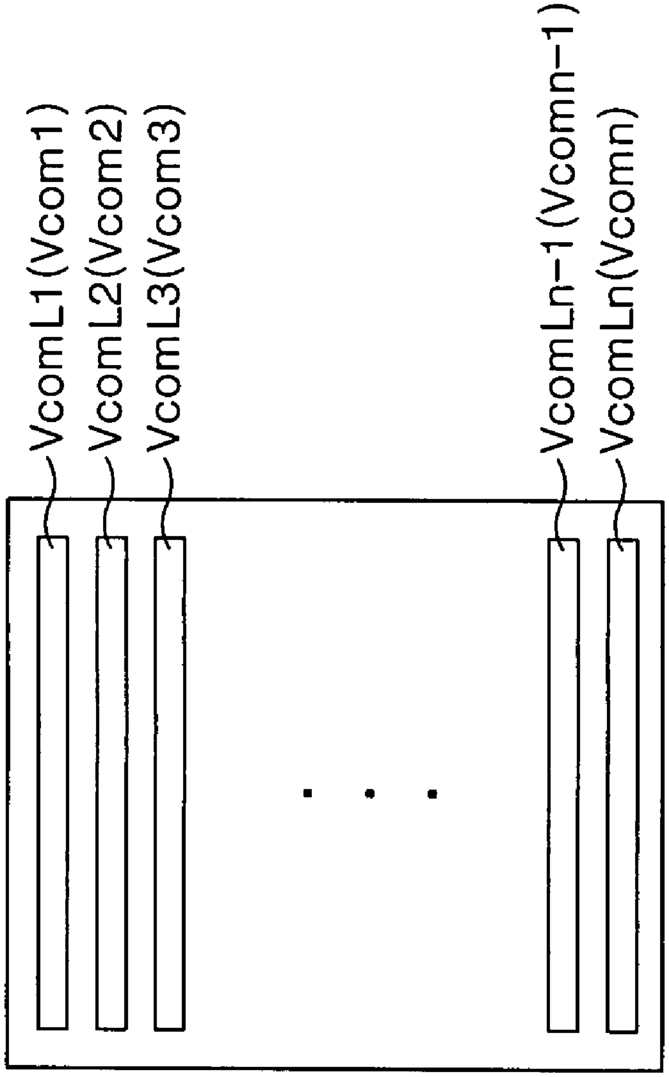
FIG. 7B is a diagram illustrating a plurality of common electrode lines divided at an upper substrate of the liquid crystal display according to the embodiment of the present invention.

FIG. 7A is a equivalent circuit diagram showing a portion of a lower substrate in a liquid crystal display of horizontal electric field applying type according to the embodiment of the present invention, and FIG. 7B is a diagram showing a plurality of common electrode lines divided at an upper substrate of the liquid crystal display of horizontal electric field applying type according to the embodiment of the present invention. The liquid crystal display of horizontal electric field applying type drives a liquid crystal of an in plane switch (hereinafter, referred to as "IPS") mode by a horizontal electric field between a pixel electrode and a common electrode. Herein, the pixel electrode and the common electrode are arranged in parallel to the lower substrate.

Referring to FIG. 7A, in the lower substrate of the liquid crystal display of vertical electric field applying type according to the embodiment of the present invention, the TFT is formed at an intersection of the gate lines GL1 and GL2 and the data line DL. In this case the TFT drives the liquid crystal cells Clc1 and Clc2. The TFT supplies the data voltage supplied via the data line DL to the pixel electrodes Ep1 and Ep2 of the liquid crystal cells Clc1 and Clc2 in response to the scanning pulse supplied via the gate lines GL1 and GL2. To this end, the gate electrode G of the TFT is connected to the gate lines GL1 and GL2, the source electrode S thereof is connected to the data line DL, and the drain electrode D thereof is connected to the pixel electrodes Ep1 and Ep2 of the liquid crystal cells Clc1 and Clc2. The first liquid crystal cell Clc1 is charged with a potential difference between a data voltage and a first common voltage Vcom1. Herein, the data voltage is supplied to the first pixel electrode Ep1, and the first common voltage Vcom1 is supplied to the first common electrode Ec1. Referring to FIG. 7B, the first common electrode Ec1 is connected to a first common electrode line VcomL1 of a plurality of common electrode lines VcomL1 to VcomLn which are divided at the lower substrate. The first common electrode Ec1 is independently supplied with the first common voltage Vcom1 via the first common electrode line VcomL1. Furthermore, the second liquid crystal cell Clc2 is charged with a potential difference between a data voltage and a second common voltage Vcom2. Herein, the data voltage is supplied to the second pixel electrode Ep2, and the second common voltage Vcom2 is supplied to the second common electrode Ec2. Referring to FIG. 7B, the second common electrode Ec2 is connected to a second common electrode line VcomL2 of a plurality of common electrode lines VcomL1 to VcomLn which are divided at the lower substrate. The second common electrode Ec2 is independently supplied with the second common voltage Vcom2 via the second common electrode line VcomL2. Herein, a polarity of the data voltage with which the first pixel electrode Ep1 is supplied and a polarity of the data voltage with which the second pixel electrode Ep2 is supplied are inversed each other on the basis of the common voltage. A potential of a common voltage is inversed in the divided common electrode line unit. In this case, the common voltage is supplied in accordance with a polarity inversion of the data voltage. For example, if a data voltage with which the first pixel electrode Ep1 is supplied is a positive polarity and a data voltage with which the second pixel electrode Ep2 is supplied is a negative polarity, the first common voltage Vcom1 of high-level potential is supplied and the second common voltage Vcom2 of low-level potential is supplied. As a result, the line inversion is realized.

On the other hand, the common electrode lines of the lower substrate may be divided into k instead of n (2≦k≦n) In this case, a polarity of the data voltage is inversed in n/k horizontal line units, and is inversed in a common electrode line that a polarity of the common voltage is divided. As a result, an n/k line inversion is realized. Hereinafter, a case that the common electrode lines of the lower substrate are divided into n will be described.

Referring to FIG. 7A, a first storage capacitor Cst1 is formed between the pixel electrode Ep1 of the first liquid crystal cell Clc1 and a dummy gate line (not shown). A second storage capacitor Cst2 is formed between the pixel electrode Ep2 of the second liquid crystal cell Clc2 and the first gate line GL1. The first and second storage capacitors Cst1 and Cst2 play a role to maintain charging voltages of the first and second liquid crystal cells Clc1 and Clc2 for one frame, respectively. Accordingly, the present invention uses the pre-stage gate line, so that an aperture ratio can be highly improved compared to the related art. Herein, the related art includes an additional storage line so as to form the storage capacitor.

Figure 8:
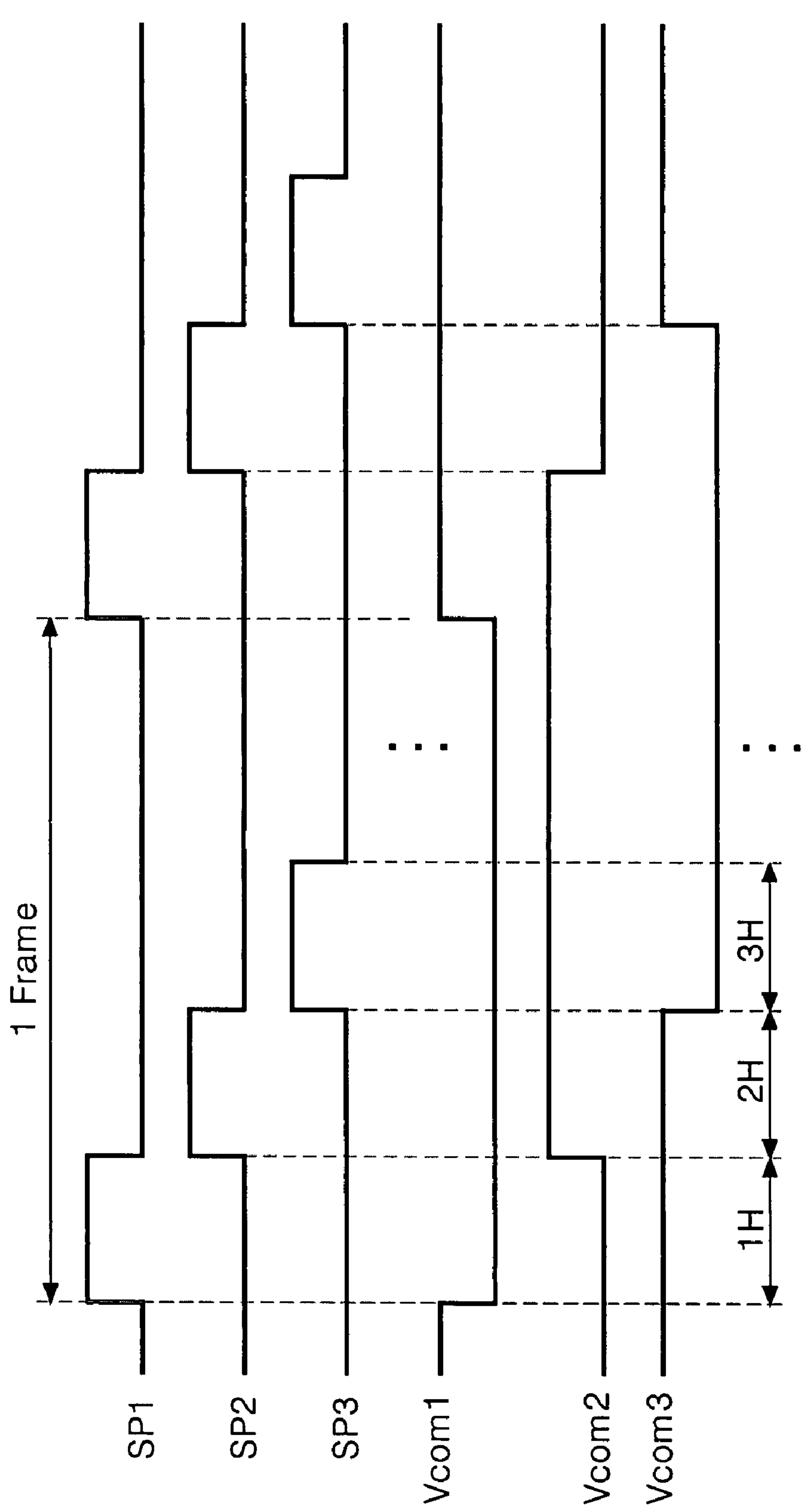
FIG. 8 is a waveform diagram of common voltages supplied to the n divided common voltage lines in FIG. 6B and FIG. 7B.

FIG. 8 is a waveform diagram of common voltages supplied to the n divided common voltage lines in FIG. 6B and FIG. 7B.

Referring to FIG. 8, a potential of the first common voltage Vcom1 is maintained as a high-level logic state for a blank period. In this case, the first common voltage is supplied to the first common voltage line VcomL1 shown in FIG. 6B and FIG. 7B. Further, the potential of the first common voltage Vcom1 is synchronized with timing that a first scanning pulse SP1 is supplied to the first gate line to be inversed in a low-level logic state. The potential of the first common voltage Vcom1 is maintained as the low-level logic state for one frame, and then is synchronized with timing that the first scanning pulse SP1 of next frame to be inversed in the high-level logic state. The data voltage of positive polarity having a potential higher than the first common voltage Vcom1 is supplied to the pixel electrodes of the first horizontal line for the first horizontal period 1H that the first common voltage Vcom1 is maintained as the low-level logic state.

A potential of the second common voltage Vcom2 is maintained as a low-level logic state for a blank period. In this case, the second common voltage is supplied to the second common voltage line VcomL2 shown in FIG. 6B and FIG. 7B. Further, the potential of the second common voltage Vcom2 is synchronized with timing that a second scanning pulse SP2 is supplied to the second gate line to be inversed in a high-level logic state. The potential of the second common voltage Vcom2 is maintained as the high-level logic state for one frame, and then is synchronized with timing that the second scanning pulse SP2 of next frame to be inversed in the low-level logic state. The data voltage of negative polarity having a potential lower than the second common voltage Vcom2 is supplied to the pixel electrodes of the second horizontal line for a second horizontal period 2H that the second common voltage Vcom2 is maintained as the high-level logic state.

A potential of the third common voltage Vcom3 is maintained as a high-level logic state for a blank period. In this case, the third common voltage is supplied to the third common voltage line VcomL3 shown in FIG. 6B and FIG. 7B. Further, the potential of the third common voltage Vcom3 is synchronized with timing that a third scanning pulse SP3 is supplied to the third gate line to be inversed in a low-level logic state. The potential of the third common voltage Vcom3 is maintained as the low-level logic state for one frame, and then is synchronized with timing that the third scanning pulse SP3 of next frame to be inversed in the high-level logic state. The data voltage of positive polarity having a potential higher than the third common voltage Vcom3 is supplied to the pixel electrodes of the third horizontal line for a third horizontal period 3H that the third common voltage Vcom3 is maintained as the low-level logic state.

The above-mentioned explanation will be described with reference to the following table 1.

TABLE 1

| Blank period | | First scanning period | | Second scanning period | | Third scanning period | |
|---|---|---|---|---|---|---|---|
| Vcom1 | High | Vcom1 | Low | Vcom1 | Low | Vcom1 | Low |
| Vcom2 | Low | Vcom2 | Low | Vcom2 | High | Vcom2 | High |
| Vcom3 | High | Vcom3 | High | Vcom3 | High | Vcom3 | Low |
| Vcom4 | Low | Vcom4 | Low | Vcom4 | Low | Vcom4 | Low |
| . . . | . . . | . . . | . . . | . . . | . . . | . . . | . . . |
| Vcomn | Low | Vcomn | Low | Vcomn | Low | Vcomn | Low |

A potential of the common voltages with which the common voltage lines are supplied is independently inversed for each divided common voltage line, and is inversed for each frame. Herein, the common voltage lines are divided into n. Accordingly, the liquid crystal display according to the embodiment of the present invention independently scans the common electrode to carry out the line inversion without changing a potential of the pixel electrode. This will be described in detail with reference to FIG. 9 to FIG. 10C.

Figure 9:
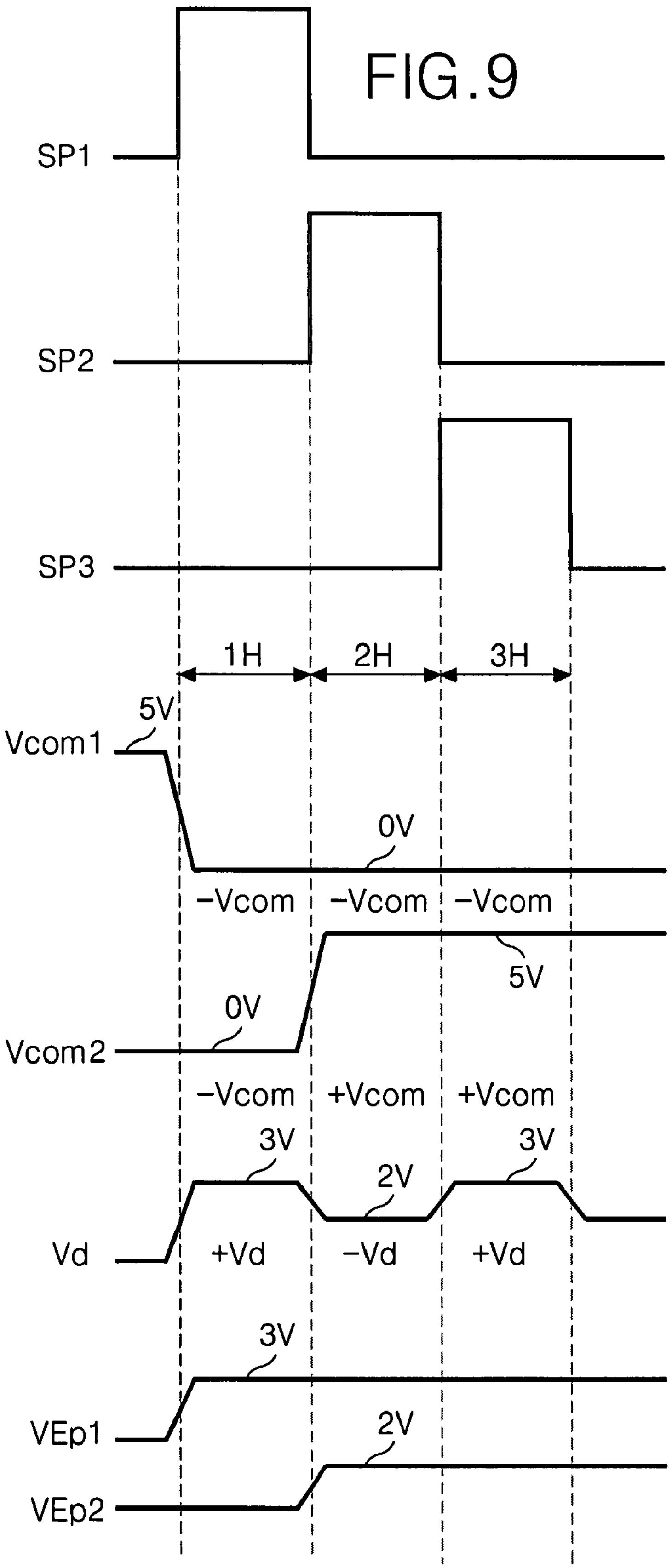
FIG. 9 is a waveform diagram of driving voltages supplied to the liquid crystal display panel in FIG. 6A to FIG. 7B.

FIG. 9 is a waveform diagram of driving voltages supplied to the liquid crystal display panel in FIG. 6A to FIG. 7B. In FIG. 9, 'SP1 and SP2' represent scanning pulses with which the first and second gate lines GL1 and GL2 are supplied, respectively, 'Vcom1' represents the first common voltage with which the first common electrode Ec1 is supplied, 'Vcom2' represents the second common voltage with which the second common electrode Ec2 is supplied, 'Vd' represents the data voltage with which the data line DL is supplied, 'VEp1' represents the potential of the first pixel electrode Ep1, and 'VEp2' represents the potential of the second pixel electrode Ep2.

Referring to FIG. 9, the first and second scanning pulses SP1 and SP2 are swung between the gate high voltage VGH turning-on the TFT and the gate low voltage VGL turning-off the TFT. The potential of the first common voltage Vcom1 is maintained as the high-level logic state for the blank period as shown in FIG. 8. Furthermore, the potential of the first common voltage Vcom1 is synchronized with timing that the first scanning pulse SP1 is supplied to the first gate line GL1 to be inversed in the low-level logic state and be maintained for one frame. The data voltage +Vd of positive polarity having a potential higher than the first common voltage Vcom1 is supplied to the first pixel electrode Ep1 for the first horizontal period 1H that the first common voltage Vcom1 is maintained as the low-level logic state. Herein, the first pixel electrode Ep1 is arranged at the first horizontal line. The data voltage +Vd charged into the first pixel electrode Ep1 is maintained as the same value for a non-scanning interval (second horizontal period 2H~(n)th horizontal period nH). This is caused by a fact that the first common voltage Vcom1 is maintained as the low-level logic state without a change for the non-scanning interval. Furthermore, the potential of the second common voltage Vcom2 is maintained as the low-level logic state for the blank period as shown in FIG. 8. Furthermore, the potential of the second common voltage Vcom2 is synchronized with timing that the second scanning pulse SP2 is supplied to the second gate line GL2 to be inversed in the high-level logic state and be maintained for one frame. The data voltage −Vd of negative polarity having a potential lower than the second common voltage Vcom2 is supplied to the second pixel electrode Ep2 for the second horizontal period 2H that the second common voltage Vcom2 is maintained as the high-level logic state. Herein, the second pixel electrode Ep2 is arranged at the second horizontal line. The data voltage −Vd charged into the second pixel electrode Ep2 is maintained as the same value for a non-scanning interval (third horizontal period 3H~(n)th horizontal period nH). This is caused by a fact that the second common voltage Vcom2 is maintained as the high-level logic state without a change for the non-scanning interval.

For example, in FIG. 9, the first common voltage Vcom1 of 0V and the second common voltage Vcom2 of 5V are applied so as to charge the liquid crystal cells Clc1 and Clc2 into 3V for one frame. If the data voltages Vd of 3V and 2V are alternatively applied in the interval of one horizontal period 1H, the potential VEp1 of the first pixel electrode is maintained as 3V for one frame, and the potential VEp2 of the second pixel electrode is maintained as 2V for one frame. Thus, the present invention can carry out the line inversion without changing the potential of the pixel electrode.

Figure 10A:
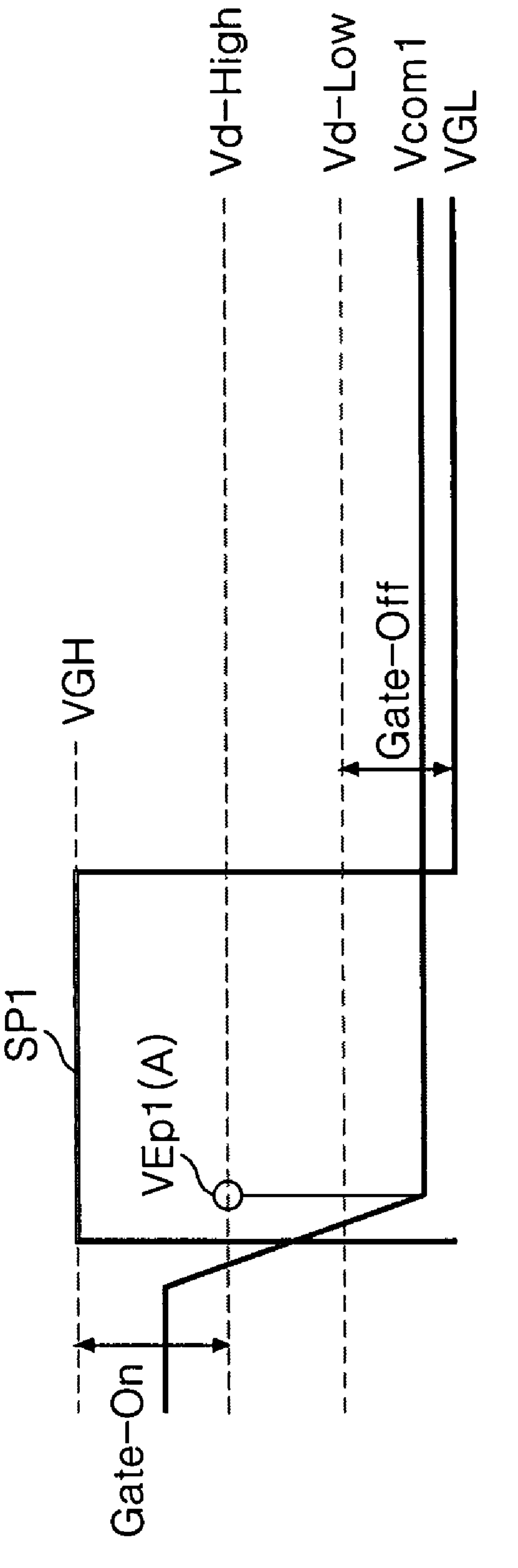
FIG. 10A to FIG. 10C are diagrams illustrating that the amplitude of a scanning pulse is decreased by a potential maintained at a pixel electrode for a non-scanning interval according to the embodiment of the present invention.
Figure 10B:
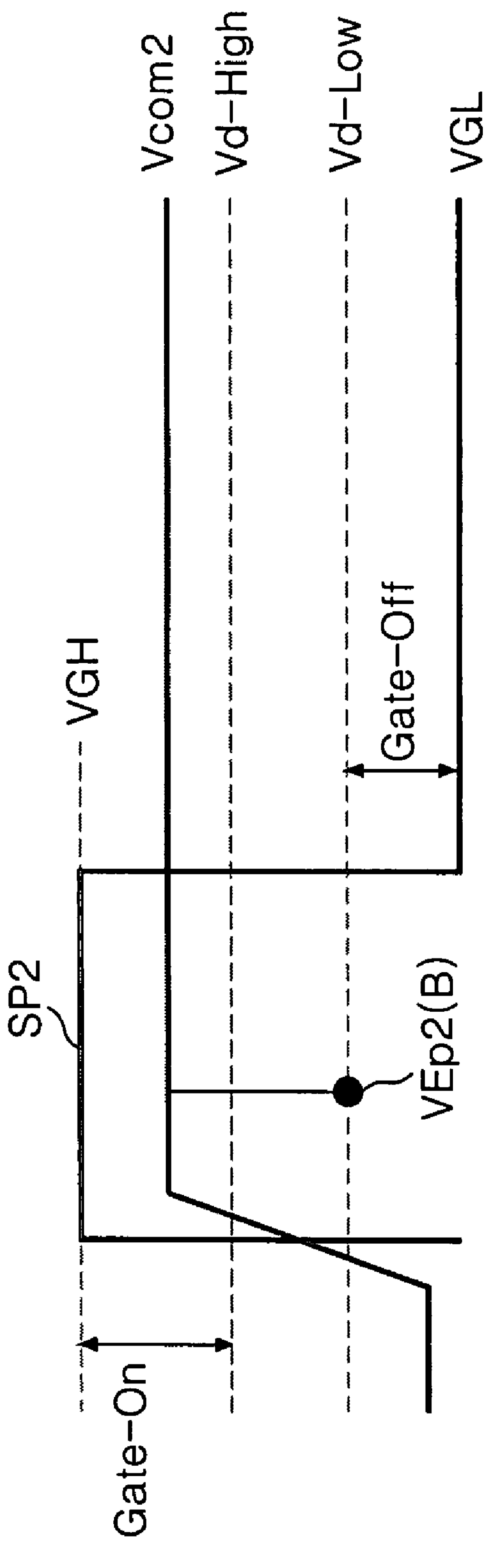
Figure 10C:
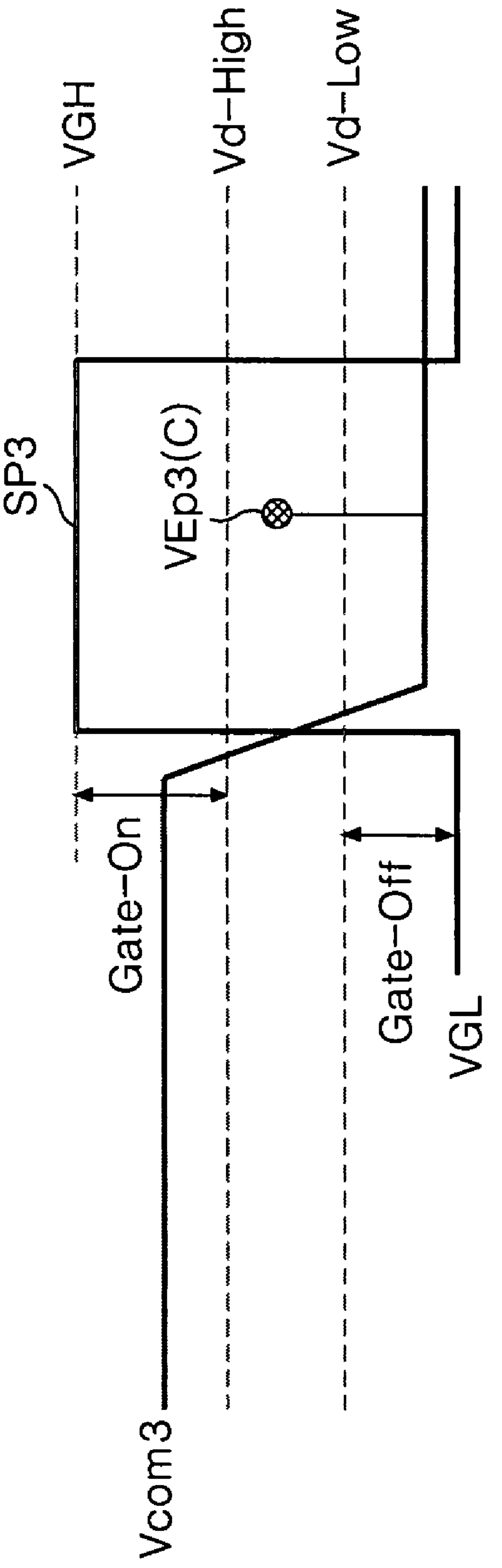

FIG. 10A to FIG. 10C are diagrams explaining a fact that amplitude of a scanning pulse is decreased by a potential maintain of a pixel electrode for a non-scanning interval.

Referring to FIG. 10A to FIG. 10C, the potential VEp1 of the first pixel electrode is synchronized at a point that the first scanning pulse SP1 is supplied. Furthermore, the potential VEp1 of the first pixel electrode is maintained as an initial value A without a change at the non-scanning interval by the first common voltage Vcom1. Herein, the first common voltage Vcom1 is maintained as the low-level logic state for one frame. In this case, the initial value A has a potential higher than the first common voltage Vcom1. The potential VEp2 of the second pixel electrode is synchronized at a point that the second scanning pulse SP2 is supplied. Furthermore, the potential VEp2 of the second pixel electrode is maintained as an initial value B without a change at the non-scanning interval by the first common voltage Vcom1. Herein, the second common voltage Vcom2 is maintained as the high-level logic state for one frame. In this case, the initial value B has a potential lower than the second common voltage Vcom2. The potential VEp3 of the third pixel electrode is synchronized at a point that the third scanning pulse SP3 is supplied. Furthermore, the potential VEp3 of the third pixel electrode is maintained as an initial value C without a change at the non-scanning interval by the third common voltage Vcom3. Herein, the third common voltage Vcom3 is maintained as the low-level logic state for one frame. In this case, the initial value C has a potential higher than the third common voltage Vcom3.

Accordingly, amplitude (VGH-VGL) of the scanning pulse is |(Vd-High+Gate-On)-(Vd-Low−Gate-Off|. The result means that amplitude of the scanning pulse is reduced as much as amplitude of Vcom compared to the related art line inversion drive. For example, if the scanning pulse is swung between −4V and 9V, amplitude of the scanning pulse can be reduced as much as approximate (3.5V+$\alpha$). If the scanning pulse is swung between −3V and 6V, amplitude of the scanning pulse can be reduced as much as approximate (2.5V+$\alpha$). Thus, the feed through voltage $\Delta$Vp is reduced by an amplitude decrease of the scanning pulse, so that a residual image and a flicker are prevented. As a result, a picture quality is improved.

In the related art, a storage capacitor is formed so as to drive a line inversion by an additional storage line of an effective display area. However, as described above, the liquid crystal display and the driving method thereof according to the present invention forms a storage capacitor between a pixel electrode of a (n)th line and a gate line of a (n−1)th line to remove an additional storage line, thereby increasing an aperture ratio.

Furthermore, the liquid crystal display and the method thereof according to the present invention have a plurality of common electrodes to which a common voltage is independently applied, and divided into more than two portions to change a potential of a common voltage into the divided common electrode unit, and that are adaptive for reducing amplitude of a scanning pulse to decrease a feed through voltage $\Delta$Vp. Thus, a residual image and a flicker are highly reduced, so that a display quality is improved.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display comprising:

liquid crystal cells arranged in (m×n) matrices, where m and n are positive integers equal to or greater than two, and configured to display an image using liquid crystal molecules driven by a potential difference between each of pixel electrodes and each of the common electrodes;

m data lines to which data voltages each are supplied;

n gate lines to which scanning pulses each are supplied;

n common electrode lines, connected with the common electrodes, to which common voltages each are supplied and which correspond to the n gate lines, respectively;

(m×n) storage capacitors between the pixel electrodes and the gate lines and configured to maintain voltages of the liquid crystal cells;

a data driver configured to inverse a polarity of each data voltage and to supply the data voltage to each data line;

a common voltage controller configured to change a potential of each common voltage and to supply the common voltage to each common electrode line, wherein the potential of the common voltage is changed synchronizing with the rising edge of a corresponding scanning pulse each frame unit and the changed potential of the common voltage is maintained for one frame;

wherein the common voltage controller supplies a first potential of the common voltage to the common electrode line if a polarity of the data voltage is positive, and supplies a second potential of the common voltage higher than the first potential to the common electrode line if the polarity of the data voltage is negative; and wherein an amplitude (VGH-VGL) of each scanning pulse is |(Vd-High+Gate-On)-(Vd-Low−Gate-Off)|, wherein VGH is a gate high voltage, VGL is a gate low voltage, Vd-High is a data high voltage, Gate-On is a gate-on voltage, Vd-Low is a data low voltage, and Gate-Off is a gate-off voltage.

2. The liquid crystal display of claim 1, wherein the storage capacitors connected to liquid crystal cells at line n reside between a pixel electrode at line n and a gate line at line n−1.

3. The liquid crystal display of claim 2, wherein the pixel electrodes and the common electrodes reside on the same substrate.

4. The liquid crystal display of claim 2, wherein the pixel electrodes and the common electrodes reside on opposing substrates with a liquid crystal layer therebetween.

5. A method of driving a liquid crystal display, including liquid crystal cells of (m×n) matrices, where m and n are positive integers, and displaying an image using liquid crystal molecules driven by a potential difference between each of pixel electrodes and each of common electrodes, m data lines to which data voltages each are supplied, n gate lines to which scanning pulses each are supplied, n common electrode lines, connected with the common electrodes, to which common voltages each are supplied and which correspond to the n gate lines, respectively, and (m×n) storage capacitors between the pixel electrodes and the gate lines, the method comprising:

inversing a polarity of each data voltage and supplying the data voltage to each data line; and changing a potential of each common voltage and supplying the common voltage to each common electrode line, wherein the potential of the common voltage is changed synchronizing with the rising edge of a corresponding scanning pulse each frame unit and the changed potential of the common voltage is maintained for one frame, wherein a first potential of the common voltage supplies to the common electrode line if a polarity of the data voltage is positive, and a second potential of the common voltage higher than the first potential suppiles to the common electrode line if the polarity of the data voltage is negative; and wherein an amplitude (VGH-VGL) of each scanning pulse is |(Vd-High+Gate-On)-(Vd-Low −Gate-Off)|, wherein VGH is a gate high voltage, VGL is a gate low voltage, Vd-High is a data high voltage, Gate-On is a gate-on voltage, Vd-Low is a data low voltage, and Gate-Off is a gate-off voltage.

6. The method of driving the liquid crystal display of claim 5, wherein the storage capacitor connected to a liquid crystal cell of the nth line is formed between a pixel electrode of the nth line and a gate line of the n−1th line.

7. The method of driving the liquid crystal display of claim 6, wherein the pixel electrodes and the common electrodes are formed on the same substrate.

8. The method of driving the liquid crystal display of claim 6, wherein the pixel electrode and the common electrode are formed on opposing substrates having a liquid crystal layer therebetween.

9. A liquid crystal display comprising:

liquid crystal cells in pixel areas defined by crossing points of a plurality of gate lines GL1 to GLn, where n is a positive integer, and a plurality of data lines DL1 to DLm, where m is a positive integer;

a plurality of common electrode lines to which common voltages each are supplied and which correspond to the gate lines, respectively;

a data driving circuit configured to supply a video signal to each of the data lines DL1 to DLm and to inverse a polarity of the data voltage;

a gate driving circuit configured to supply a scanning pulse to each of the gate lines GL1 to GLn; and a common voltage controller configured to allow a high-level potential common voltage+Vcom and a low-level potential common voltages−Vcom to be alternatively supplied to the common electrode lines, wherein the potential of the common voltage is changed synchronizing with the rising edge of a corresponding scanning pulse each frame unit and the changed potential of the common voltage is maintained for one frame;

wherein the common voltage controller supplies the low-level potential common voltage −Vcom to the common electrode line if a polarity of the data voltage is positive, and supplies the high-level potential common voltage +Vcom to the common electrode line if the polarity of the data voltage is negative; and wherein an amplitude (VGH-VGL) of the scanning pulse is |(Vd-High+Gate-On)-(Vd-Low−Gate-Off)|, wherein VGH is a gate high voltage, VGL is a gate low voltage, Vd-High is a data high voltage, Gate-On is a gate-on voltage, Vd-Low is a data low voltage, and Gate-Off is a gate-off voltage.

10. The liquid crystal display of claim 9 further comprising (m×n) storage capacitors between pixel electrodes of the liquid crystal cells and the gate lines and configured to maintain voltages of the liquid crystal cells.

11. The liquid crystal display of claim 10, wherein the storage capacitors connected to liquid crystal cells at line n reside between a pixel electrode at line n and a gate line at line n−1.

12. The liquid crystal display of claim 10, wherein the pixel electrodes and common electrodes of the liquid crystal cells reside on the same substrate.

13. The liquid crystal display as claimed in claim 10, wherein the pixel electrodes and common electrodes of the liquid crystal cells reside on opposing substrates with a liquid crystal layer therebetween.

* * * * *